(12) United States Patent
Crary et al.

(10) Patent No.: US 11,321,571 B2
(45) Date of Patent: May 3, 2022

(54) AUTOMATIC LICENSE PLATE RECOGNITION (ALPR) AND VEHICLE IDENTIFICATION PROFILE METHODS AND SYSTEMS

(71) Applicant: NEOLOGY, INC., San Diego, CA (US)

(72) Inventors: Peter Crary, Austin, TX (US); Peter Istenes, Budapest (HU); Dave Bynum, Knoxville, TN (US); Israel Padilla, Mexico City (MX)

(73) Assignee: NEOLOGY, INC., San Diego, CA (US)

( * ) Notice: Subject to any disclaimer, the term of this patent is extended or adjusted under 35 U.S.C. 154(b) by 0 days.

(21) Appl. No.: 17/033,506

(22) Filed: Sep. 25, 2020

(65) Prior Publication Data
US 2021/0097306 A1     Apr. 1, 2021

Related U.S. Application Data

(60) Provisional application No. 62/906,668, filed on Sep. 26, 2019.

(51) Int. Cl.
*G06K 9/00* (2006.01)

(52) U.S. Cl.
CPC ..... *G06K 9/00791* (2013.01); *G06K 9/00744* (2013.01); *G06K 2209/01* (2013.01); *G06K 2209/15* (2013.01); *G06K 2209/23* (2013.01)

(58) Field of Classification Search
CPC .......... G06K 9/00791; G06K 9/00744; G06K 2209/23; G06K 2209/15; G06K 2209/01; G06K 9/00785
See application file for complete search history.

(56) References Cited

U.S. PATENT DOCUMENTS

| | | | |
|---|---|---|---|
| 2004/0233036 A1* | 11/2004 | Sefton | G07B 15/04 340/5.53 |
| 2009/0208059 A1* | 8/2009 | Geva | G08G 1/14 382/105 |

(Continued)

OTHER PUBLICATIONS

International Search Report for corresponding application No. PCT/US2020/052878, dated Dec. 7, 2020, in 14 pages.

*Primary Examiner* — Dhaval V Patel
(74) *Attorney, Agent, or Firm* — Procopio, Cory, Hargreaves & Savitch LLP

(57) ABSTRACT

Embodiments herein provide various systems and methods for automated classification of vehicle reads to build vehicle identification profile and for automated vehicle identification using content extracted from an image frame of a vehicle to identify a most probable vehicle identification profile. An example method comprises capturing, by a camera, a read comprising an image frame including a portion of a vehicle; identifying at least one of a license plate number and a descriptor of the vehicle using image processing on the read; determining a probability value that the read includes the vehicle based on the identified at least one of the license plate number and the descriptor; when the probability value exceeds a threshold value, identifying a vehicle identification profile in a database using the identified at least one of the license plate number and the descriptor; and updating the vehicle identification profile to include the captured read.

18 Claims, 11 Drawing Sheets

(56) References Cited

U.S. PATENT DOCUMENTS

| | | | |
|---|---|---|---|
| 2010/0195871 A1* | 8/2010 | Simon | G06K 9/209 |
| | | | 382/105 |
| 2012/0155712 A1* | 6/2012 | Paul | G06K 9/00 |
| | | | 382/105 |
| 2015/0049914 A1* | 2/2015 | Alves | G06K 9/033 |
| | | | 382/105 |
| 2016/0300119 A1* | 10/2016 | Silva | G06F 16/2228 |
| 2017/0372161 A1* | 12/2017 | Almeida | G06K 9/00785 |
| 2020/0401833 A1* | 12/2020 | Popov | G06K 9/6263 |

* cited by examiner

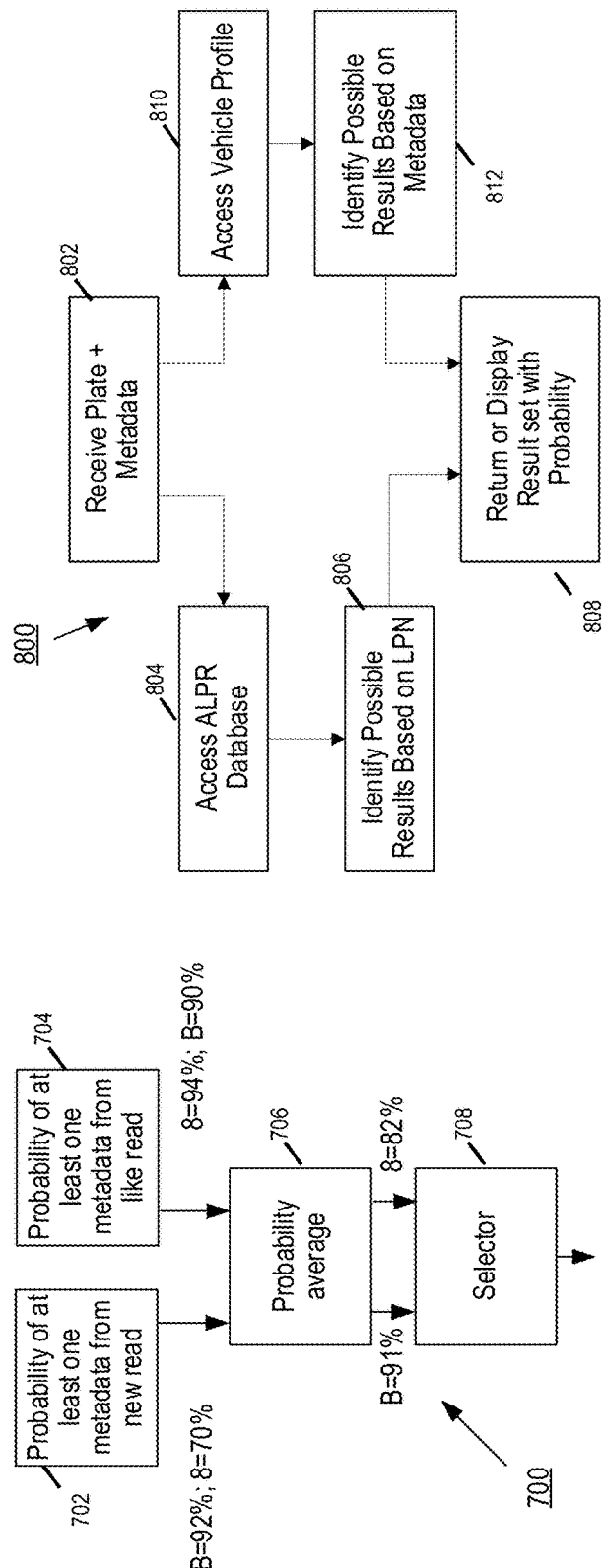
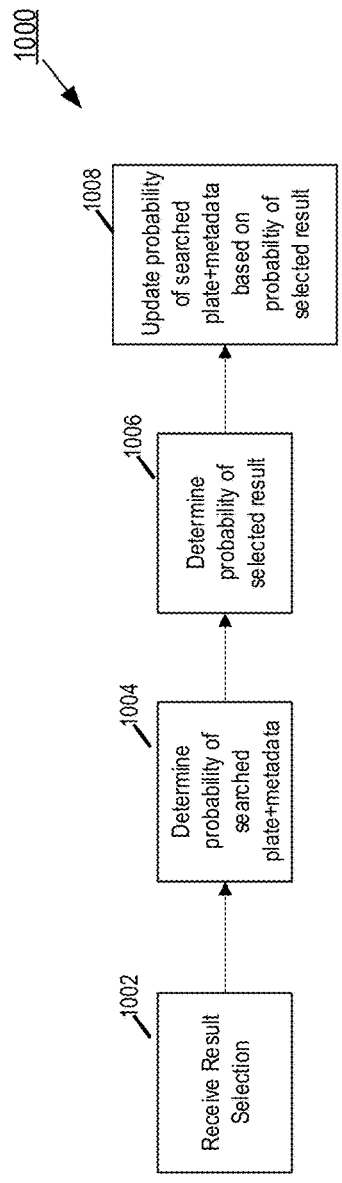
FIG. 8
FIG. 10
FIG. 7

AUTOMATIC LICENSE PLATE RECOGNITION (ALPR) AND VEHICLE IDENTIFICATION PROFILE METHODS AND SYSTEMS

RELATED APPLICATION INFORMATION

This patent application claims the benefit under 35 U. S. C. § 119 (e) to U.S. Provisional Application No. 62/906,668, entitled "AUTOMATIC LICENSE PLATE RECOGNITION (ALPR) AND VEHICLE PROFILE METHODS AND SYSTEMS", filed Sep. 26, 2019, the disclosure of which is incorporated herein by reference in its entirety.

TECHNICAL FIELD

The present disclosure relates to the field of character and object recognition for automatic number plate recognition (ANPR) or automatic license plate recognition (ALPR) systems. More specifically, the present disclosure relates to using an optical character recognition (OCR) engine and a feature recognition and classification engine to identify the characters on a license plate and build a vehicle identification profile.

BACKGROUND

ALPR and ANPR (used interchangeably herein) systems are used by security and law enforcement personnel to find and read vehicle license plate numbers in images produced by video cameras and still cameras. As shown in FIG. 1, a typical ALPR system consists of a video imaging device, a video capture device and a computer running ALPR software. The video camera sends video images to the video capture device as a standard television format video signal. The video capture device converts the video signal into digital image information and stores the digital information in the computer. The computer's software then begins the ALPR process by first locating the license plate in the image as represented by the digital information. If a license plate is detected in the image, the computer software performs a character recognition process to "vehicle read" or "read" the license plate number.

In ALPR applications, it is important to maximize the read accuracy of a license plate. The characters on a license plate can be difficult for an OCR engine to detect for a variety of reasons. For example, many license plates have a variety of designs or pictures included to indicate what country or state the plate is from, to support a special cause, or to allow a motorist to select a plate that they like. These designs or pictures can make it more difficult to detect characters on the plate when the pictures overlap the characters or even when the pictures are located on a perimeter of the plate.

In other instances, plates can be dirty or can be partially or fully covered or obscured by snow, sand, a license plate frame, tow bars or hitches, or other objects or debris that may obscure the plate. Plates also age with time and may become damaged due to weather or impact, such as in a traffic accident.

A variety of approaches are used to ensure accurate plate reads, or character recognition. One approach is to collect an image of the plate illuminated by each of visible light and infrared light. One or both of these images can be used to ensure better read accuracy.

Additionally, a variety of types of OCR engines or systems can be used to read the characters on a license plate. However, various OCR engines have varying results and levels of accurate read rates based on the algorithm used by the particular engine.

An improvement in accurately identifying characters on a license plate would be welcomed.

SUMMARY

Embodiments described herein provide various systems and methods identifying at least one of characters on a license plate and descriptors (e.g., visual or physical characteristics and features of the vehicle) of a vehicle from an image frame to build a vehicle identification profile. Embodiments herein also provide for systems and methods for extracting the license plate number and/or descriptors from an image frame for identifying the vehicle by searching the vehicle identification profile.

According to an aspect, a vehicle identification method is disclosed. This method includes capturing, by a camera, a read of a vehicle comprising at least one image frame from a video signal including at least a portion vehicle; identifying at least one of a license plate number and a descriptor of the vehicle contained in the read using image processing on the at least one image frame; and determining a probability value that the read includes the vehicle based on the identified at least one of the license plate number and the descriptor. The method also includes identifying a vehicle identification profile in a database using the identified at least one of the license plate number and the descriptor when the probability value exceeds a threshold value and updating the vehicle identification profile to include the captured read.

According to another aspect, vehicle identification system is disclosed. The system includes a camera configured to capture a read of a vehicle comprising at least one image frame from a video signal including a vehicle; at least one database configured to store vehicle identification profiles; and at least one processor configured to execute instructions stored on a memory. The at least one processor is configured to identify at least one of a license plate number and a descriptor of the vehicle contained in the read using image processing on the at least one image frame and determine a probability value that the read includes the vehicle based on the identified at least one of the license plate number and the descriptor. The processor is also configured to identify a vehicle identification profile in a database using the identified at least one of the license plate number and the descriptor when the probability value exceeds a threshold value and update a vehicle identification profile to include the captured read.

Other features and advantages of the present inventive concept should be apparent from the following description which illustrates by way of example aspects of the present inventive concept.

BRIEF DESCRIPTION OF THE DRAWINGS

Various embodiments disclosed herein are described in detail with reference to the following figures. The drawings are provided for purposes of illustration only and merely depict typical or example embodiments. These drawings are provided to facilitate the reader's understanding and shall not be considered limiting of the breadth, scope, or applicability of the embodiments. It should be noted that for clarity and ease of illustration these drawings are not necessarily made to scale.

FIG. 7 is an example process flow for updating confidence levels of vehicle identification profile data (e.g., probability value), in accordance with embodiments disclosed herein;

FIG. 8 is an example process flow for performing a search, in accordance with embodiments disclosed herein;

FIG. 10 illustrates an example process flow for updating a vehicle identification profile using search results, in accordance with embodiments disclosed herein;

Figure 1:
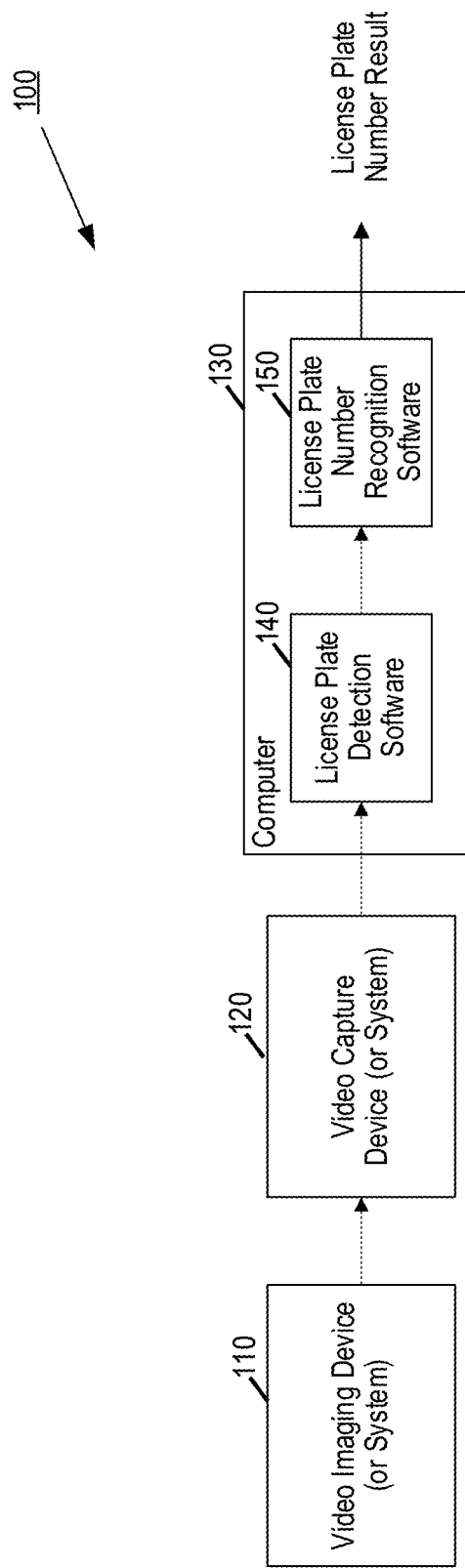
FIG. 1 depicts a prior art automatic license plate reading system.

The various embodiments mentioned above are described in further detail with reference to the aforementioned figures and the following detailed description of exemplary embodiments.

DETAILED DESCRIPTION

Embodiments disclosed herein provide methods and systems for utilizing image data and associated metadata to create a profile on a particular vehicle. In an embodiment, a video imaging device is used to view a scene and generate a corresponding standard video signal. From the video signal, the systems herein identify visual or physical characteristics and features of a vehicle and create metadata representative of the identified characteristics (referred to herein as "descriptors"). The descriptors are associated with each image and used to build a profile for the particular vehicle, which includes searchable descriptors representative of, for example but not limited to, a license plate number, color, make, model, year, distinctive damage or other unique or distinctive features of the vehicle. In some embodiments, the vehicle is identified, based on the profile, in subsequently generated video signals (e.g., referred to herein as a "read") and the system processes subsequent reads to match like plates and vehicles descriptions across multiple reads in order to build an individual vehicle identification profile. The profile data may be used against incoming image data to give help determine the probability that the incoming image data (e.g., a subsequent read) corresponds to the particular profile. The profile data may also be used to enhance image data searching by including plates that may have been misread but are excluded from a search and it helps provide greater confidence in searches based on vehicle description.

After reading this description it will become apparent how to implement the embodiments described in various alternative implementations. Further, although various embodiments are described herein, it is understood that these embodiments are presented by way of example only, and not limitation. As such, this detailed description of various alternative embodiments should not be construed to limit the scope or breadth of the appended claims.

The term "video signal" generally refers to a composite video signal formatted according to the NTSC (National Television System Committee) standard, the PAL (phase-alternating line) standard or the SÉCAM (Séquentiel couleur à mémoire) standard. As will be appreciated by those skilled in the art, such video signals comprise some number of frames per second (such as 29.97 fps for NTSC), where each frame consists of some number of horizontal lines (such as 525 lines for NTSC) that are traced sequentially in a raster-scan fashion. In the NTSC format, 484 of the 525 lines of each frame are used to form the video image, while the remaining lines are used for sync, vertical retrace and other information, such as closed-captioning.

As used herein, the term "scene" generally refers to one or more video images as captured by a video imaging device. Thus, a "scene" may also generally refer to one or more frames of video information in a video signal.

The term "characters" or the phrase "characters-of-interest" as used herein generally refer to a string of letters and/or numbers as typically comprise a vehicle license plate number. However, it should be appreciated that the present invention is also applicable to detection and reading of other types of character strings or symbols, and is not limited solely to license plate recognition.

Figure 2:
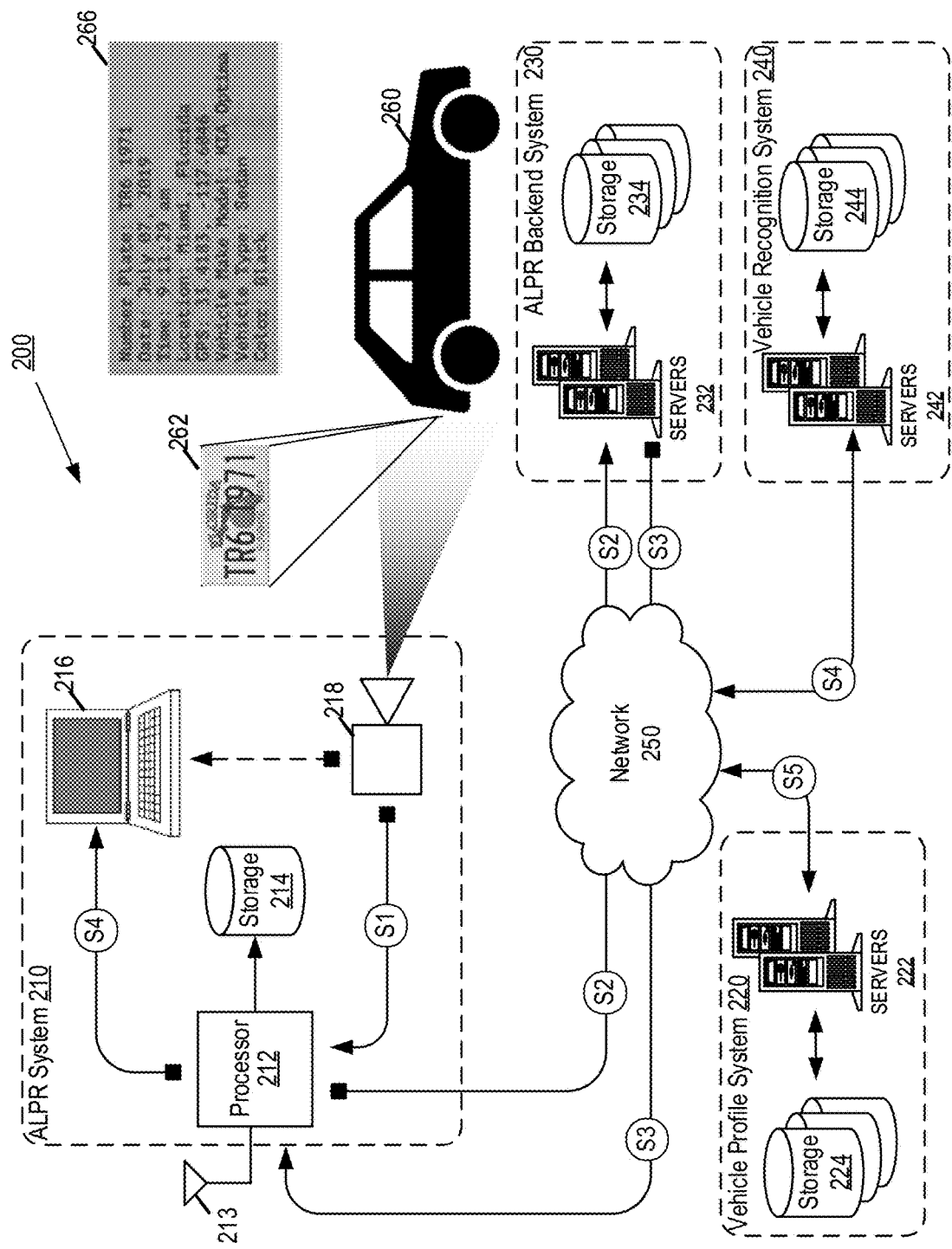
FIG. 2 depicts a functional block diagram of a video processing system in accordance with various aspects of the present disclosure.

FIG. 2 depicts a functional block diagram of a video processing system in accordance with various aspects of the present disclosure. FIG. 2 depicts video processing system 200 for generating a video signal of a scene comprising vehicle 260 having a license plate 262 and other identifying features or characteristics and extracting images from the video signal containing the license plate 262. License plate 262 includes a state name and license plate number (LPN) and characters, such as, alphanumerics, graphics, symbols, logos, shapes and other identifiers. A license plate number is the alphanumeric identifier embossed or printed on a license plate.

The video processing system 200 comprises an ALPR system 210, ALPR backend system 230, vehicle recognition system 240; and a vehicle identification profile system 220. Each of the respective systems may be communicatively coupled to each other via a network 250. Network 250 may be a wired or wireless network, for example but not limited to, cellular networks, Wi-Fi, local-area-networks, wide-area-networks, etc.

ALPR system 210 may be, for example, the typical ALPR system of FIG. 1. As another example, the ALPR system 210 may include an imaging device and a video capture device, such as a camera 218, and a processor 212 running ALPR software stored in storage device 214. In some embodiments, the ALPR system 210 may be implemented, for example, using techniques similar to those disclosed in U.S. Pat. No. 8,218,821, the disclosures of which are each incorporated herein by reference in their entirety.

The ALPR camera 218 includes a video imaging device, which comprises standard video camera lenses, electro optics and electronic circuitry for capturing optical images and converting the optical images into a video signal. An example of ALPR camera 218 is the model number P362 video surveillance camera, IRIS Fixed Camera platform, and/or Golden Eagle mobile platform owned by Neology, Inc. In some embodiments, ALPR camera 218 may include one or more of infrared cameras and/or visible light cameras. Infrared cameras can be used to detect the number on the license plate, and visible light cameras can take photographs of the vehicle or driver to use as evidence of the violation. Illumination of the area is often used to improve image quality of the visible light camera, especially in the hours of darkness.

The ALPR system 210 may provide for performing the computationally-intensive license plate detection process in video hardware. In an embodiment, a video imaging device is used to view a scene and generate a corresponding video signal. The signal from the video imaging device is processed for license plate detection, such as using techniques similar to those disclosed in U.K. Patent No. GB2332322B, the disclosure of which is incorporated herein by reference in its entirety. Once a license plate is detected, the ALPR may embed license plate coordinates into video signal, such as using techniques similar to those disclosed in U.S. Pat. No. 8,218,821. A video capture device captures the video images from the video signal and an optical character recognition (OCR) engine executes a license plate reading algorithm running on the computer to process only those video frame(s) of the video signal containing the license plate 262. The OCR engine produces a read and confidence level (also referred to herein as a confidence value and/or probability value) associated with processed frame received by OCR engine by extracting and correctly identifying the characters from the license plate number in the image. "Reading," "reads," or "read accuracy" means the machine interpretation of the license plate number or character contained on a license plate.

The ALPR system 210 may be a stationary or fixed ALPR system, for example, having a fixed ALPR camera disposed along a roadway coupled to a termination box (e.g., ALPR processor) that is communicatively coupled via network 250 to backend system 230. For example, the ALPR system may include the IRIS Fixed Camera platform offered by Neology, Inc. In another embodiment, the ALPR system may be a mobile system, for example, having an ALPR camera disposed on a vehicle coupled to an ALPR processor disposed thereon. For example, the Golden Eagle mobile platform offered by PIPS Technology, Inc. In some embodiments, the ALPR processor may be coupled to an in-car computer 216 providing a user interface, for example, such as that implemented by PAGIS™, a software application offered by Neology, Inc.

The ALPR camera 218 generates a video signal of the scene including vehicle 260 and the license plate 262. The video signal is communicated to the ALPR processor 212 at 51, which executes license plate detection processes to identify image frames of the video signal containing license plate 262. The identified frames are extracted and processed by the OCR engine to produce a read for each identified frame. The read comprises image data of the extracted frame and metadata of the identified of the characters from the license plate number of license plate 262 and a determined the confidence value for the read. The read may be stored in local ALPR storage 214 or stored at the backend system 230. Each read may be communicated over network 250, via antenna 213, to the ALPR backend system 230 as S2.

The backend system 230 may include severs 232 and database 234. The backend system 230 may be configured as a central repository for all read data and include software modules to support data analysis, queries, and reporting. The backend system 230 may interface with other remote database of interest, for example, NCIC, DMV, DOJ, etc. At S3, database information, for example, in response data queries, may be communicated back to the ALPR system 210, for example, where the ALPR system 210 is a mobile ALPR system. If the ALPR system 210 is a fixed system, the computer 216 may be remote from ALPR system 210 and communicatively coupled instead to ALPR backend system 230. Queries based on a read may be used to access a remote database, such as a DMV database, and retrieve identifying information 266 corresponding to the license plate 262. The identifying information 266 may be associated with the read as descriptors in the form of metadata.

In various embodiments, the video processing system 200 includes a vehicle recognition system 240. In an example embodiment, the vehicle recognition system 240 comprises a server 242 and a database 244 that is communicatively coupled to the video processing system 200 via network 250. In another embodiment, the vehicle recognition system 240 may be integrated into the ALPR system 210 or backend system 230, for example, as a feature recognition and classification engine. The vehicle recognition system 240 may be receive image data of each read execute object detection algorithms to identify, extract, and classify distinctive visual features or characteristics of the vehicle 260 associated with the license plate 262. Example feature recognition algorithms include, but are not limited to, optical character recognition, edge detection, corner detection, blob detection, ridge detection, etc. The vehicle recognition system 240 produces one or more descriptors and corresponding confidence levels for each feature identified in a given read frame by extracting and identifying the features and retrieving descriptors corresponding to the identified features from a database. The descriptors and confidence levels are embedded into the read as metadata. An example vehicle recognition system 240 may be the artificial intelligence based vehicle classification system provided by the Mantis Vehicle Recognition platform owned by Neology, Inc.

In various embodiments, each read may be communicated to the vehicle recognition system 240 at S4 for processing to identify distinguishing visual features or characteristics of the vehicle 260, generating metadata including descriptors of the identified features and corresponding confidence levels, and associating the metadata with each read. The descriptors, confidence levels, reads, and associations there between may be stored in the database 244. In some embodiments, the reads and associated descriptors are communicated to a vehicle identification profile system 220 at S5 that builds a profile of the vehicle 260 based on a plurality of reads, descriptors, and confidence levels associated therewith, an example of which is provided below in connection to FIGS. 6-10. The reads (e.g., image data of each frame containing a license plate 262) and metadata (e.g., license plate number, descriptors, and confidence levels) may be stored in databases 224 and/or 244. In some embodiments, the vehicle identification profile system 220 and vehicle recognition system 240 may be integrated into the ALPR system 210 and/or backend system 230 as, for example, software modules for executing processes associated therewith. As such, the database 234 may be configured as the central repository for all read data and descriptor metadata.

Figure 3:
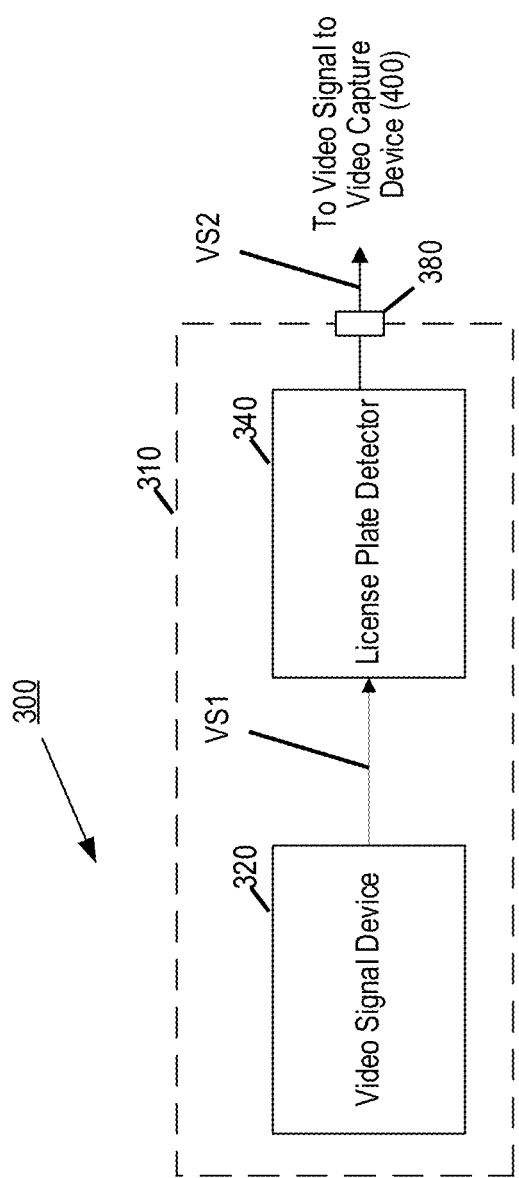
FIG. 3 depicts a functional block diagram of an example video signal device in accordance with various aspects of the present disclosure.
Figure 4:
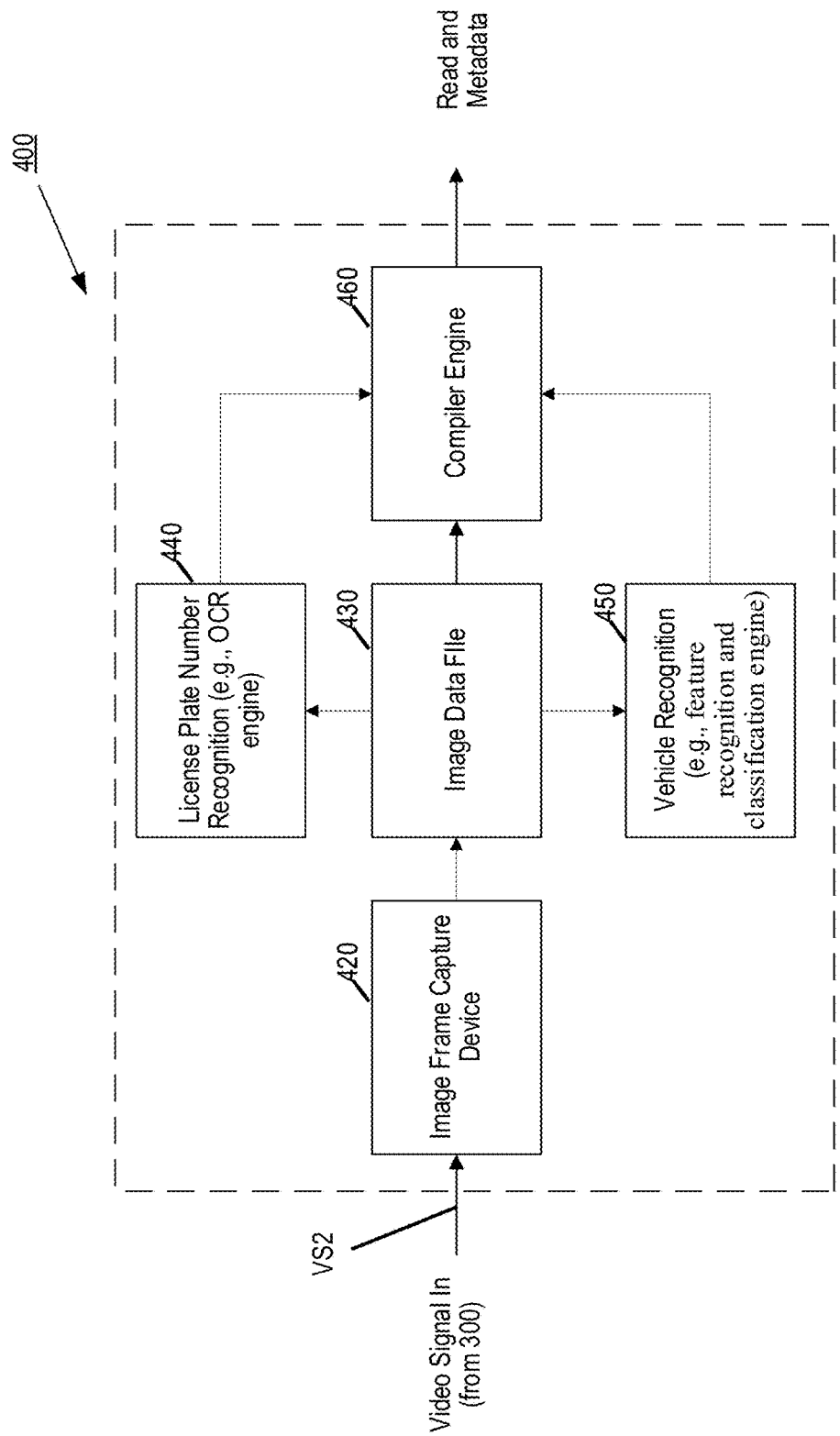
FIG. 4 depicts a functional block diagram of an image processing system in accordance with various aspects of the present disclosure.

FIG. 3 depicts a functional block diagram of an example video signal device in accordance with various aspects of the present disclosure. FIG. 4 depicts a functional block diagram of an image processing system in accordance with various aspects of the present disclosure.

Figure 5:
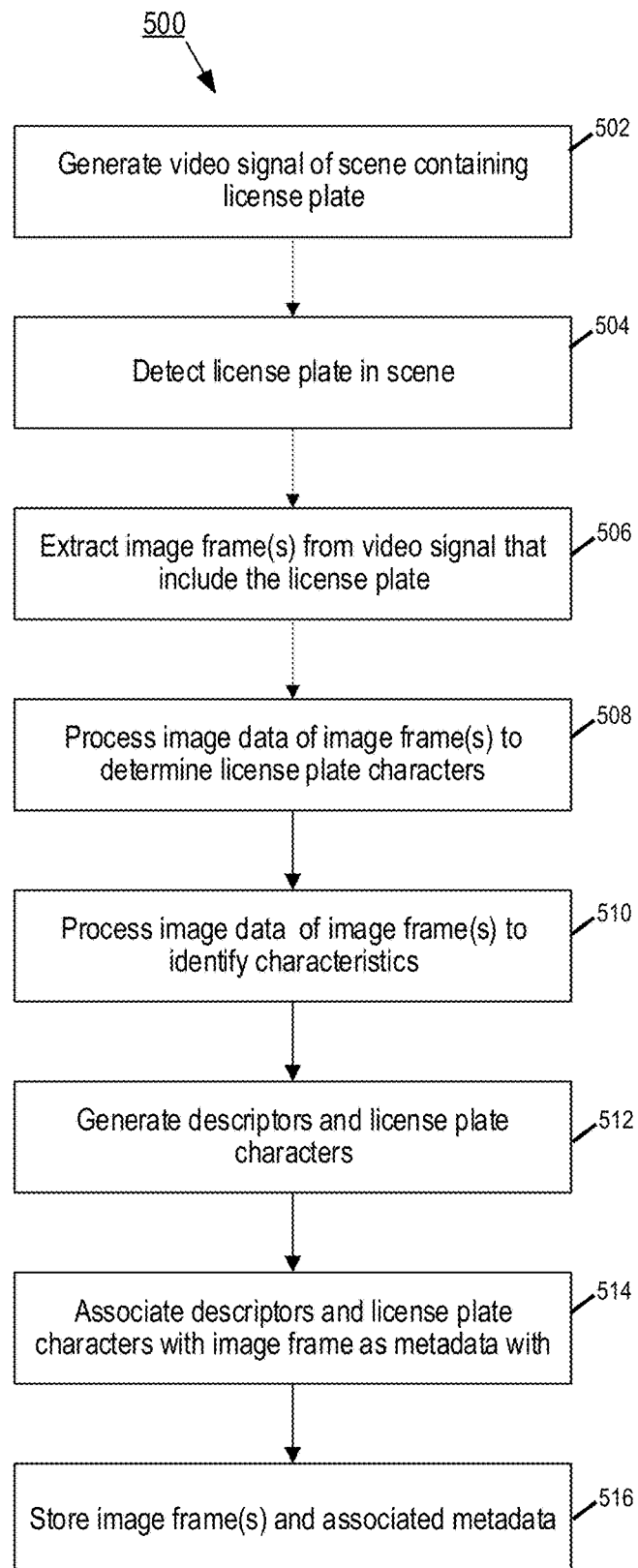
FIG. 5 an example process flow for processing a video image to locate and extract information from characters-of-interest.

FIG. 3 depicts an embodiment of a video camera 300 having built-in license plate detection circuitry. The video camera 300 may be an example implementation of the camera 218 of FIG. 2. The components of the camera 300, each of which is described in more detail below, are contained within a housing 310 which has a form factor similar to that of a video surveillance camera. In the following description, reference is made to FIG. 5. FIG. 5 an example process flow for processing a video image to locate and extract information from characters-of-interest.

The camera 300 includes a video imaging device 320, which comprises standard video camera lenses, electro optics and electronic circuitry for capturing optical images and converting the optical images into a video signal (step 502 in FIG. 5). One example of the video imaging device 320 is the model number P362 video surveillance camera offered by Neology, Inc. The video signal at the output of the imaging device 320 is referred to herein as the first video signal VS1.

The camera 300 also includes a license plate detector circuit 340 which receives the first video signal VS1 from the video imaging device 320. According to an embodiment, the license plate detector circuit 340 operates on the first video signal VS1 according to the techniques described in UK patent number GB2332322 to locate a vehicle license plate within one or more of the images of a video signal produced by the imaging device 320 (step 504). The first video signal VS1 may also be processed as described, for example, in U.S. Pat. No. 8,218,821. It will be appreciated that other techniques may be implemented in the license plate detector circuit 340 to locate a license plate and generate one or more location coordinates indicating a position of the license plate within a video frame. The process described in GB2332322 is merely an example of one technique. In some embodiments, detecting the license plate may comprise reading a radio frequency identification (RFID) tag associated with the license plate, for example, where the license plate is an RFID enabled license plate. Examples of RFID enabled license plates are described in U.S. Pat. Nos. 9,691,014; 10,632,966; 8,344,890, the disclosures of which are each incorporated herein by reference. Other examples of RFID tags usable to detect a license plate number include RFID enabled mirrors disposed on the vehicle, as described in U.S. Pat. No. 9,688,202, the disclosure of which is incorporated herein by reference. As another example, an RF reader may detect a signal a signal from a mobile device and decode a MAC address from the signal. The MAC address may be associated with a license plate number, which the license plate detector 340 may retrieve based on decoding the MAC address.

In an embodiment, the video imaging device 320 and plate detector circuit 340 may be packaged in a single housing 310 which is represented in FIG. 3 by the dashed box. A video output connector 380 may be disposed on the housing 310 for providing a second video signal VS2 to subsequent components.

FIG. 4 depicts an embodiment of an image processing system 400. Generally, the system 400 receives the second video signal VS2, converts the signal VS2 into a digital video format comprising a plurality of image frames, locates the license plate within one or more image frames, captures and stores each image frame comprising the license plate as an image frame, and determines the license plate number and descriptors for each image frame (e.g., for each read). Second video signal VS2 may be received directly from a source (e.g., camera 320 of FIG. 3) or accessed from a storage device or database based on a previously recorded video. In an embodiment, these functions are performed by components of a computer or server, for example, by ALPR processor 212, server 232, and/or server 242 executing software instructions stored in a memory or storage device coupled thereto. The system 400 includes an image frame capture device 420, such as an digital signal processing device (DSP), for receiving the second video signal VS2 and extracting the image frames of the video signal containing the detected license plate as identified in step 504 (step 506). The image frames are extracted and stored for subsequent processing as respective image data files 430 (also referred to herein as read files or read data).

A license plate number recognition module 440 receives the image data file 430 (or read data) determines the alphanumeric characters included in the plate (step 508). The module 440 operates only on those frame(s) in which a license plate is detected. For example, the module 440 operates on the extracted frames from step 506. The character determination process may be performed via OCR engine using a technique such as, for example, that implemented in PAGIS™, a software application offered by Neology, Inc. Character recognition may be executed by any object recognition technique used to identify objects in images and/or video sequences, for example, optical character recognition, edge detection, corner detection, blob detection, ridge detection, etc. Thus, the output of the license plate number recognition module 440 is a string of alphanumeric characters representative of the license plate number and a confidence level of the recognition process (step 512) (e.g., a probability value that the identified characters has been correctly identified). Since the license plate is located by the circuitry in the camera 300, the system 400 need not engage in the computationally intensive task of locating the plate.

A vehicle recognition module 450 (also referred to herein as the vehicle recognition engine) also receives the image data and identifies the vehicle to which the plate corresponds and identifies distinguishing features and characteristics of the vehicle (510). As with module 440, the module 450 operates only on those frame(s) in which a license plate is detected (e.g., frames that are extracted at step 506). The vehicle recognition process may be performed by the feature recognition and classification engine using a technique such as those implemented in Mantis Vehicle Recognition, a software application owned by Neology, Inc. Vehicle recognition may be executed by any object recognition technique used to identify features and characteristics of the vehicle in images and/or video sequences, for example, optical character recognition, edge detection, corner detection, blob detection, ridge detection, etc. Example algorithms include, for example but not limited to, Canny, Sobel, Deriche, Harris operator, Shi and Tomasi, level curve curvature, Hessian feature strength measures, Laplacian of Gaussian, Different of Gaussians, Determinate of Hessian, Hough transform, structure tensor, SIFT, SURF, and the like. The module 450 may access a database of descriptive alphanumeric descriptors associated with previously detected characteristics/features, and, using the characteristic identified in given image frame, retrieve a descriptive alphanumeric descriptor and attach the descriptor to the read as metadata. Thus module 450 classifies characteristics as descriptors. The classification may be executed and refined through application of machine learning, such as but not limited to, artificial neural networks and deep learning, decision trees and learning thereof, support vector machines, regression analysis, Bayesian networks, and the like. Thus, the output of the vehicle recognition module 450 is a plurality of descriptors each being a string of alphanumeric characters representative of the identified features and a confidence level of the recognition and classification process for each descriptor (step 512) (e.g., a probability value that the identified feature has been correctly identified).

Each read may correspond to a plurality of confidence levels. For example, each descriptor and character of a license plate number may have a corresponding confidence level. Additionally, the confidence levels of each descriptor and character may be combined to derive an overall confidence level of the read, for example, through an averaging of all confidence levels and/or a weighted average. An example of such is provided in connection with FIG. 7 below.

A compiler module 560 may compile each read represented by the image data file with the descriptors and determined alphanumeric characters of the plate. For example, the compiler 460 may receive descriptors of each feature and/or characteristic identified in the image and the license plate number and attached, embed, or otherwise associate the received information with the respective read (step 514) and a probability value for the read may be determined based on the confidence of the received descriptors and license plate number. The read (e.g., each image frame including a license plate) and associated metadata may be stored in a database (step 516) for subsequent retrieval.

In some embodiments, the complier module 560 may receive one or more descriptors and determine a probability score for the read without a license plate number. In this case, the read may be used to search like reads in the vehicle profile system 220 that are most probable to corresponds to the current read and then retrieve a license plate number that is associated with the like reads. Thus, the retrieved license plate number may be the most probable number of the current read based on identifying like reads in the profile system 220.

The foregoing description of embodiments have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

Figure 6:
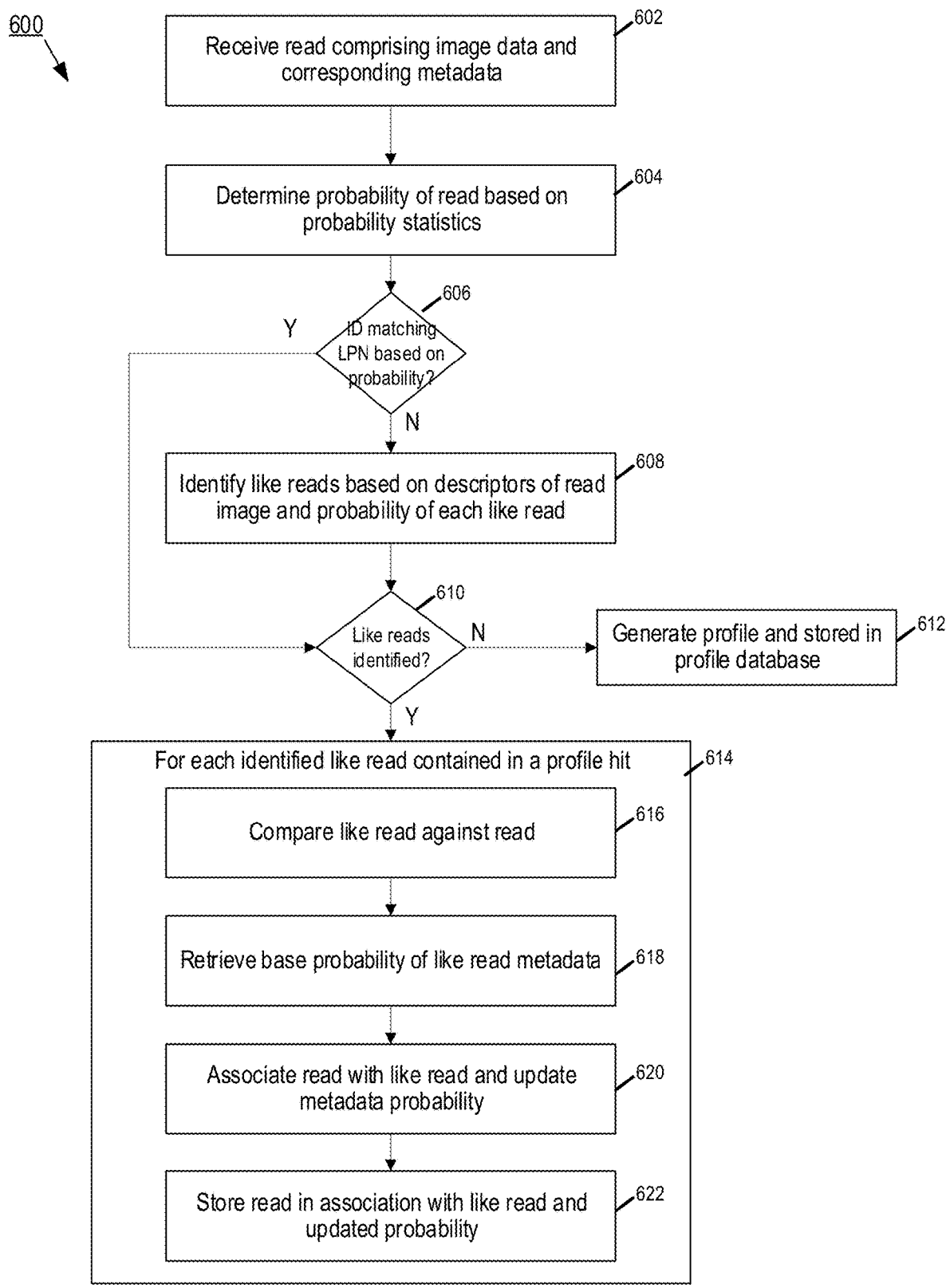
FIG. 6 illustrates an example process flow for generating a vehicle identification profile using one or more reads and associated metadata from the video processing system of FIG. 1, in accordance with embodiments disclosed herein.

FIG. 6 illustrates an example process flow for generating a vehicle identification profile using one or more reads and associated metadata from the video processing system of FIG. 1, in accordance with embodiments disclosed herein. Process 600 of FIG. 6 may be performed by a processor executing instructions stored in memory, for example, one or more of the ALPR system 210, backend system 230 and/or vehicle identification profile system 220 of FIG. 2. Process 600 utilizes a plurality of reads, metadata, and confidence levels that the descriptors and license plate number of the metadata are correctly recognized to build and update the profile with additional reads and improve the confidence that a given read corresponds to the identified license plate, and vice versa. For example, the descriptors associated with each read may be used to build the vehicle identification profile by leveraging common descriptors between reads to confirm the accuracy of both the license plate number and descriptors. The reads and associated metadata representative of a common vehicle are compiled and associated as vehicle identification profile data, such that previously stored reads may be used against new reads to determine that new reads do correspond to the particular profile and to increase confidence levels of previously stored reads. Thus, profile data may also be used to enhance searching, for example, where misread license plates may be included but, due to comparisons against other reads are excluded from a search based on comparisons of the confidence levels. Thus, embodiments herein provide improved confidence in searches based on vehicle feature metadata.

At step 602, a read comprising image data and corresponding metadata is received, for example, by an ALPR system or vehicle identification profile system. The read image may be an image frame of a video signal as described above in connection to FIGS. 3-5. The metadata may comprise confidence levels, descriptors, and a license plate number as described herein. The read may be received following step 516 of FIG. 5 or may be accessed from a storage device. The probability (e.g., confidence level) that the read corresponds to the identified vehicle may be determined, for example, based on combining (e.g., a summation or average as described below in connection to FIG. 7) the probability values that the descriptors and license plate number have been correctly recognized, algorithms used to recognize the metadata, image quality metrics of the read image, and other aspects affecting the accuracy of the character and object recognition process (step 604). In some embodiments, the probability value may be determined when the metadata is generated, for example as part of steps 508, 510, and/or 512 of FIG. 5, and the probability values may be included in metadata and retrieved at step 604. The probability score of the read is indicative that the read is more probable than not to correspond to the vehicle identified by the metadata (e.g., the license plate number and/or descriptors).

At 606, process 600 identifies whether a profile exists based on the license plate associated with the read image. That is, a database may be accessed storing profiles each associated with a license plate number. If a license plate number was detected in the read and the probability score exceeds a threshold, the license plate number of the read is used to identify a matching license plate number from a database of license plate numbers (step 606). In various embodiments, the determination may be based on the probability or confidence in the accuracy of the license plate number recognition by the OCR engine. For example, the probability value may be determined for the license plate number, and if the probability value is above a threshold that license plate number may be associated with the read image and the identified license plate number retrieved from the database. Example thresholds may be any desired probability such that the read is more likely than not (e.g., greater than 50% probable) to include the license plate number. In some embodiments, the threshold may be 75% or greater, 80% or greater, etc.

If a matching license plate number exists in the database, process 600 identifies whether like reads exist that are associated with the license plate number (step 610). For example, previously stored reads may be associated the license plate number identified in step 606, for example through a previous execution of process 600 on the stored reads prior to association with the license plate number. Each previously stored read may have probability value corresponding to the license plate number and, where the probability value exceeds a threshold value (e.g., more probable than not as described above), may be determined to be a like read to the read image. Like reads may be grouped or associated with each other as vehicle identification profile data. Each read may be associated with one or more vehicle identification profiles, for example, based on misreads and variations in probability values.

If step 606 returns "NO", at step 608 the process 600 performs a similar analysis on descriptors of the read. For example, at step 604 the process 600 may determine that the read is more likely than not to include the characteristics of "white SUV with a white spare tire" from the probability values of the descriptors and append the determined probability to the read. The identified descriptors and associated probability value of the read may be used to identify like reads previously stored read and having their own associated probability values. Where the values exceed a threshold, the previously stored reads may be identified as like reads. Step 608 may also be performed if the probability of the read containing a license plate number is lower than the threshold or a license plate was not detected in the read.

At step 610, if no like reads exist within the database (e.g., based on probability values), the process 600 generates a profile entry within the database and associates the read with the profile. If like reads do exist (e.g., profile hit), the process has identified vehicle identification profile data for the read image and proceeds to step 614 for each identified like read contained in the profile. The profile may have a base probability value that is a composite of the probability values of all reads associate therewith, including for example, probability values for each descriptor and license plate number. The read image is compared against each respective like read (step 616), for example, by a comparator module or circuit of the vehicle identification profile system and/or vehicle recognition system, and probability values for each like read are retrieved (step 618). For example, the probability values of a given read are compared by the comparator against the probability values of the read image already included in the profile to determine whether the read image is to be associated with the identified profile. This comparison may be performed on a read to read basis or on a metadata basis, for example, for each piece of metadata (e.g., each descriptor and character of the license plate). Following the comparison, the read image is associated with the like read (e.g., associated as part of the profile data) and the probability value of the profile is updated (step 620) and stored in a database (step 622).

FIG. 7 is an example process flow for updating confidence levels of vehicle identification profile data (e.g., probability value), in accordance with embodiments disclosed herein. At step 702 and 704, probability values for a piece of metadata (e.g., a descriptor or license plate number) are retrieved for a new read and a like read. If more than one pieces of metadata are retrieved, the process 700 may be performed for each respective piece of metadata. Furthermore, process 700 may also be performed on overall confidence levels of each read, or using a new read confidence level to update an overall profile confidence level.

In the example shown in FIG. 7, the process 700 is executed for a given character of a license plate. However, process 700 may be performed on any piece of metadata (e.g., descriptors or one or more license plate characters), on overall read confidence levels, etc. Returning to the example of FIG. 7, the probability value for a given character in a license plate number are described. For the new read image, the license number recognition module identified that the character was a "B" and assigned a 92% confidence level with that result, and alternately identified that the character was an "8" with an associated confidence level of 70%. For a like read, the license number recognition module identified that the character was an "8" with an associated confidence level of 94%, and that the character was a "B" with an associated confidence level of 90%.

At step 706, the process 700 averages the confidence level for the top result from the new read image ("B"; 92%) with the confidence level for that same result from the like read (90%) to identify an average confidence level for "B" of 91%. The fusion module also averages the confidence level for the top result from the like read ("8"; 94%) with the associate confidence level for the same result from the new read image (70%) to identify an average confidence level for "8" of 82%.

At step 708, the process 700 compares the average confidence level associated with the top result from the new read image ("B"; 91%) to the average confidence level associated with the top result from the like read ("8"; 82%) to select a final result for that given character of "B" because of the higher average confidence level.

The process shown in FIG. 7 looks at confidence (e.g., probability) values for both reads to determine the "best" result. This includes comparing not only first results but also less likely results.

While the foregoing example is described in connection with a single piece of metadata for each read, the same or a similar process may be carried out for each probability value associated with reads. For example, overall probability values for new read images and/or like reads, as well as probability value for a profile as compared to a new read image.

FIG. 8 is an example process flow for performing a search, in accordance with embodiments disclosed herein. FIG. 8 illustrates a process 800 that may be executed, for example, at computer 216 of FIG. 2 or another remote computing device communicatively coupled to the ALPR system 210 of FIG. 2. ALPR system 210 and/or or backend system 230 may receive a query including a license plate number, one or more descriptors, or a combination thereof (step 802). The ALPR backend system 230 may access database 234 (step 832) to retrieve possible hits (e.g., results) based on the received license plate number (step 806) and transmit the results to the requesting computing device. As used herein, search parameters may refer to and include the license plate number input into a search interface of a graphical user interface. The results may be displayed (step 808) via, for example, a user interface on the computing device. In some situations, the query may not include a license plate number, and thus either may not access the ALPR database or no results would be returned if the ALPR database is accessed.

Simultaneously, or nearly simultaneously, the vehicle identification profile system 220 may receive the query including the license plate number and/or descriptors. Search parameters may also refer to and include descriptions input into a search interface of a graphical user interface that correspond to descriptor metadata. At 810, the vehicle identification profile system 220 may access the vehicle identification profile database 224 and identify possible results (e.g., hits) based on the received metadata (step 812). For example, the hits may be identified in a manner similar that described above in connection to FIG. 6 for identifying like reads and/or profile data. The vehicle identification profile system 220 may transmit the results to the requesting computing device, which may be displayed (step 808) via, for example, a user interface on the computing device including probability values. In some situations, the query may not include descriptors, and thus either may not access the vehicle profile or no results would be returned if the vehicle profile is accessed.

At step 808, the confidence level of the search results may be combined via a fusion module or circuit of the video processing system disclosed herein to produce an overall confidence level in the search results. For example, a plurality of reads may be retrieved for a given search query, each read having a confidence levels associated therewith. The confidence level of each metadata used to retrieve (e.g., corresponding to the search parameters) the results may be combined, for example using process 600, to derive a confidence level for the search results. Each search result may have a derived confidence level and the entire returned search results may be a cumulative confidence level.

Figure 9:
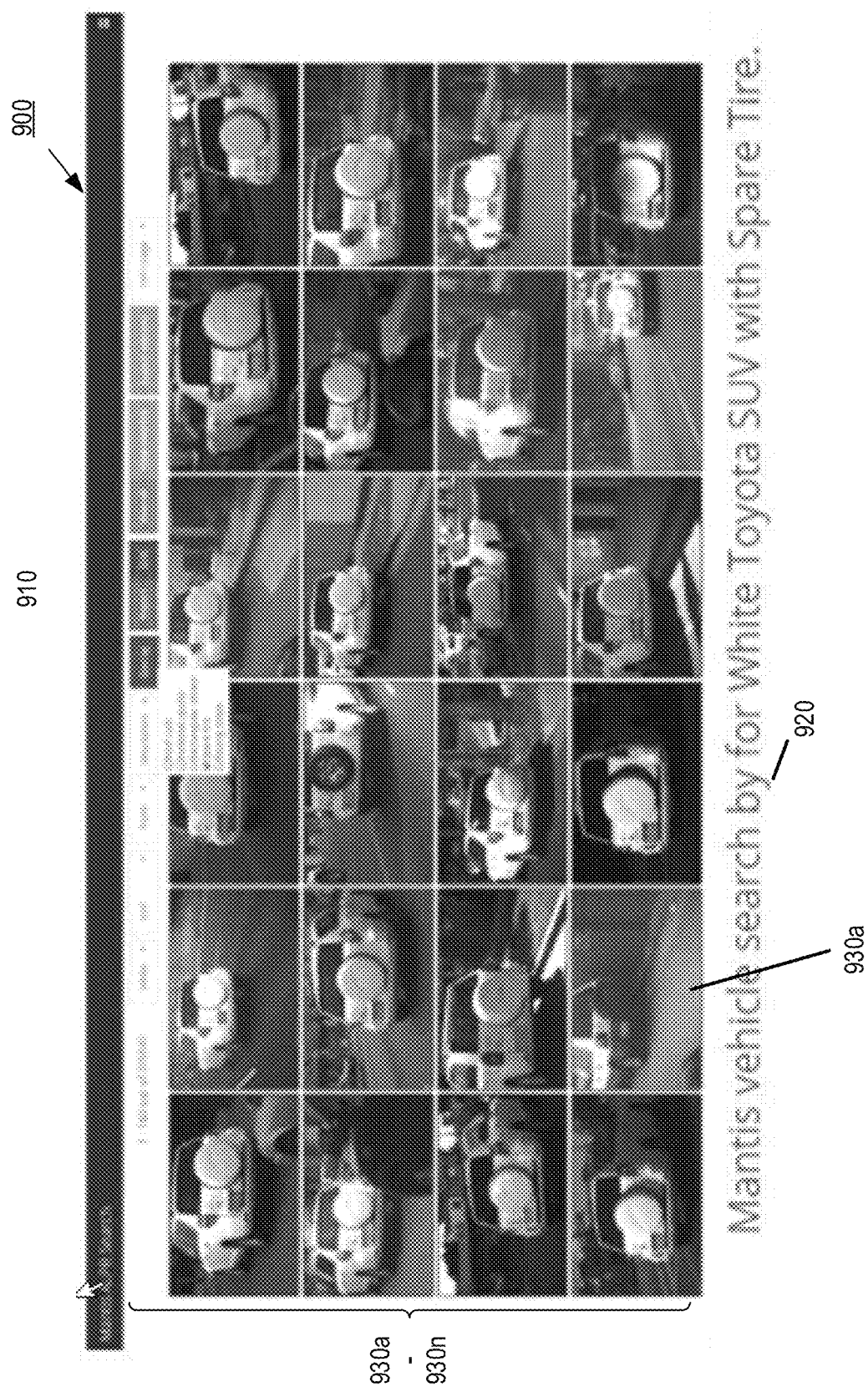
FIG. 9 illustrates an example screen shot of a graphical user interface displaying search results, in accordance with embodiments disclosed herein.

FIG. 9 illustrates an example screen shot of a graphical user interface displaying search results, in accordance with embodiments disclosed herein. FIG. 9 illustrates screen 900 generated, for example, on the requesting computing device based on the query at step 802. Screen 900 illustrates query input fields 910 where various search parameter inputs may be entered by the user. For example, the license plate number, make, model, vehicle type (e.g., coupe, sedan, SUV, convertible, etc.), year, and any other distinctive information. Distinctive information may include distinctive damage (e.g., dent on passenger side of rear bumper, missing or broken driver side tail light, spare tire, bumper sticker on driver side of rear bumper, etc.). The results or hits are graphically displayed as thumbnail images 930*a*-930*n* of each read and a summary of the search query 920 may be provided.

From screen 900, a user may select and/or interact with the search results. For example, a user may be able to select one or more reads for further examination, modification of license plate number and/or descriptors, confirm license plate number and/or descriptors, etc. For example, image 930*a* includes a SUV having a spare tire; however, unlike many of the other hits that spare tire of image 930*a* has a black cover and the bottom portion of the SUV is a different color. Thus, it may be likely that image 930*a* was not correctly identified and the profile may be updated accordingly.

FIG. 10 illustrates an example process flow for updating a vehicle identification profile using search results, in accordance with embodiments disclosed herein. Process 1000 beings at 1002 where search results are received, for example, as described above at step 808 of FIG. 8. The results may be displayed on a user interface, for example, as described above in connection with FIG. 9. At 1002, a selection of one or more reads from the search results are received, for example, by a user selecting one or more results via the user interface. User selection may include identifying the selected results is correct, which may include increasing the confidence or probability value (e.g., to 100% confidence). In another example, the user selection may include identifying that the selected result is incorrect, which may include decreasing the confidence or probability value (e.g., to 0% confidence). The change in confidence level may be applied on a metadata basis or to the overall read confidence level. At step 1004, the probability of the searched queries is determined, for example, by retrieving the probabilities associated with the search parameter (e.g., license plate number and/or descriptor) from the metadata of the profile and/or each hit. At step 1006, the probability of the selected hit is determined, for example, as described above. The probability of the selected hit is then used to update the probability of the searched queries with respect to the profile data and/or the remaining search results. Updating of the probability may be carried out, for example, as described above in connection to FIG. 7.

Embodiments herein provide for building and creating a vehicle identification profile based on a license plate number and numerous distinctive characteristics/features. The embodiments herein provide for strengthen confidence in new reads through the use of previously stored reads to ensure accuracy of a new read, as well as to update previously stored reads. Thus, the systems herein provide for self-correcting for improved accuracy through this use of existing reads and new reads, as well as interactions with search results. As the number of the distinctive features identified by the vehicle recognition system increases, the confidence level achieved is also increased. Furthermore, the larger number of distinctive features may facilitate recognizing changes made to the vehicle details (e.g., addition of a bumper sticker in a later read, change in color of the vehicle, etc.) without manual user intervention. That is, embodiments herein may recognize, through the use of other distinctive features and license plate numbers, that a given aspect of the vehicle has changed and modify profile data accordingly. Furthermore, distinctive features may be leveraged to identify a change in license plate number for a given car, which may be indicative of a theft or other immoral activity. Thus, the profile data may be used as a vehicle "fingerprint" to identify the vehicle even if some information (e.g., a license plate number) is missing, illegible, or changed. Confidence levels may be increased through an increase in the number of reads to add more descriptors and/or improve confidence of existing descriptors and license plate number recognitions. Additionally, the descriptors may be leveraged to correct other descriptors and/or incorrectly identified license plate numbers.

Figure 11:
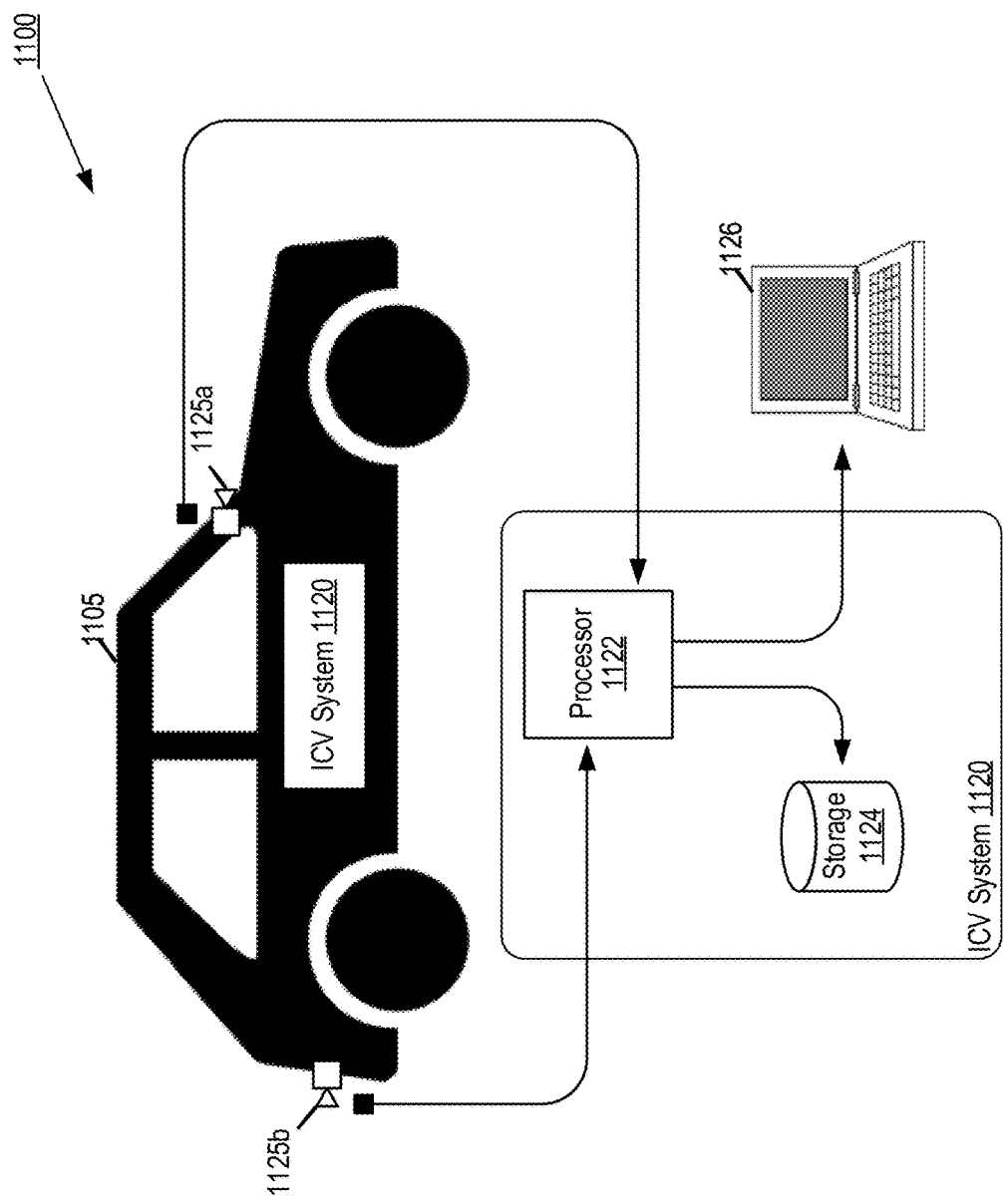
FIG. 11 depicts a functional block diagram of an in-car video (ICV) system.

FIG. 11 depicts a functional block diagram of an in-car video (ICV) system. The ICV system 1120 may be similar to a conventional dash-cam disposed on a vehicle 1105, comprising a forward facing imaging device 1125*a* and/or a rear facing imaging device 1125*b* (collectively imaging device 1125). The imaging devices 1125 may include standard video camera lenses, electro optics and electronic circuitry for capturing optical images and converting the optical images into a video signal. Imaging devices 1125 are coupled to a conventional ICV system 1120 including a processor 1122 and storage device 1124.

Conventionally, ICV systems 1120 capture video signals of a scene, convert the video signals into a digital video stream or file having a standard digital format (e.g., Digital Video (DV) format, Audio Video Interleave (AVI) format or Moving Picture Experts Group (MPEG), etc.), and stores the video stream in storage device 124. An example usage of ICV system 1120 is on law enforcement vehicles, where the ICV system 1120 is activated and records a video stream when sirens on vehicle 1105 are activated. The video stream is not generally viewed or modified at the time of recording, and is accessed later to view external computing device 1126 to view the recorded video. Thus, the storage device 1124 stores a plurality of video streams that are stored based on a timestamp or automatically generated naming convention. Typically, these video streams have minimal metadata, such as for example, GPS coordinates of whether the video was recorded, timestamp of when the video was recorded, identification of the camera used to record the video, etc.

However, the video stream is not associated with the characteristics of the scene that the camera was used to record.

Figure 12:
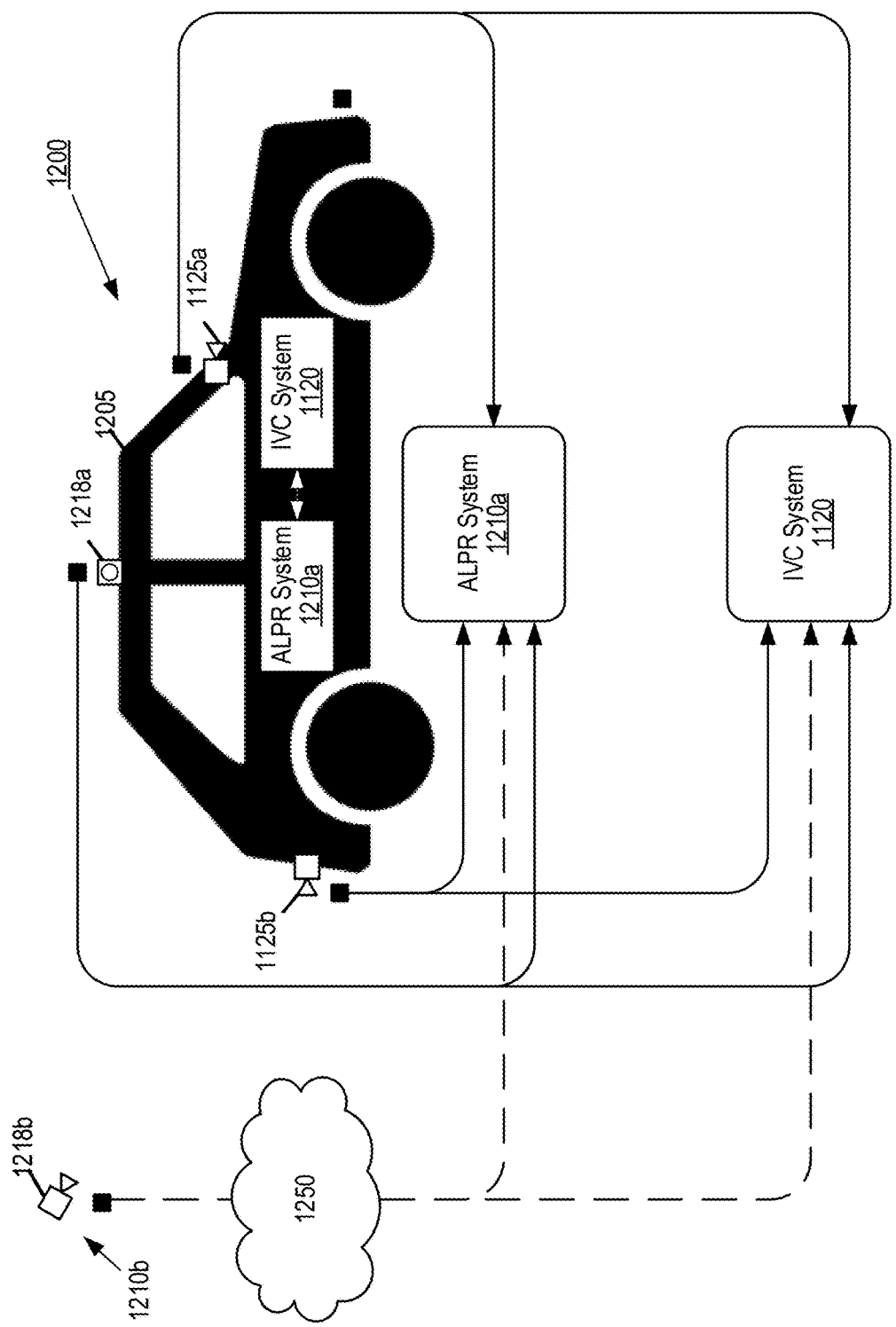
FIG. 12 depicts a functional block diagram of the video processing system of FIG. 2 coupled to an ICV system, in accordance with various aspects of the present disclosure.

Accordingly, embodiments herein provide extracting reads, as described herein, from video feeds generated by conventional ICV systems (e.g., ICV system 1120) and recognizing and embedding metadata such as license plate numbers and descriptors to the reads. For example, FIG. 12 depicts a functional block diagram of the video processing system of FIG. 2 coupled to an ICV system, in accordance with various aspects of the present disclosure. The video processing system 1200 may include a mobile ALPR system 1210*a* disposed on vehicle 1205 and communicatively coupled to ICV system 1120, via a wired (e.g., USB or other I/O interface) or wireless connection (e.g., local network). The mobile ALPR system 1210*a* may be substantially similar to the ALPR system 210 of FIG. 2, except that the mobile ALPR system 210 receives video signals from ICV imaging devise 1125 as well as camera 1218. Similarly, ICV system 1120 may receive video signals from camera 1218. Video signals from imaging device 1125 may be processed in the same manner as video signals from camera 1218, for example, as described above in connection to FIGS. 2-11.

Thus, ALPR system 1210*a* extracts image frames from the video signals of imaging devices 1125 based on a detected license plate, recognizes the license plate number through the OCR engine to produce a read, optionally recognizes vehicle characteristics through the feature recognition and classification engine, and stores the read with associated metadata. Similarly, the ALPR camera 1218*a* (and stationary ALPR camera 1218*b*) may provide video signals to the ICV system 1120 via the connection and feed the ICV system 120 the video feed from the ALPR cameras to act as additional ICV cameras.

Accordingly, the number of cameras for each system may be increased from the conventional number of cameras. Additionally, the cumulative field of view is increased, for example, ICV systems typically employ cameras capturing scenes from directly in front of or directly behind the vehicle. Whereas, ALPR systems typically employ cameras pointed diagonally and/or perpendicularly with respect to the front facing direction. By leveraging the ALPR cameras and ICV cameras, each respective system may gain a field of view previously unavailable to the respective system.

Figure 13:
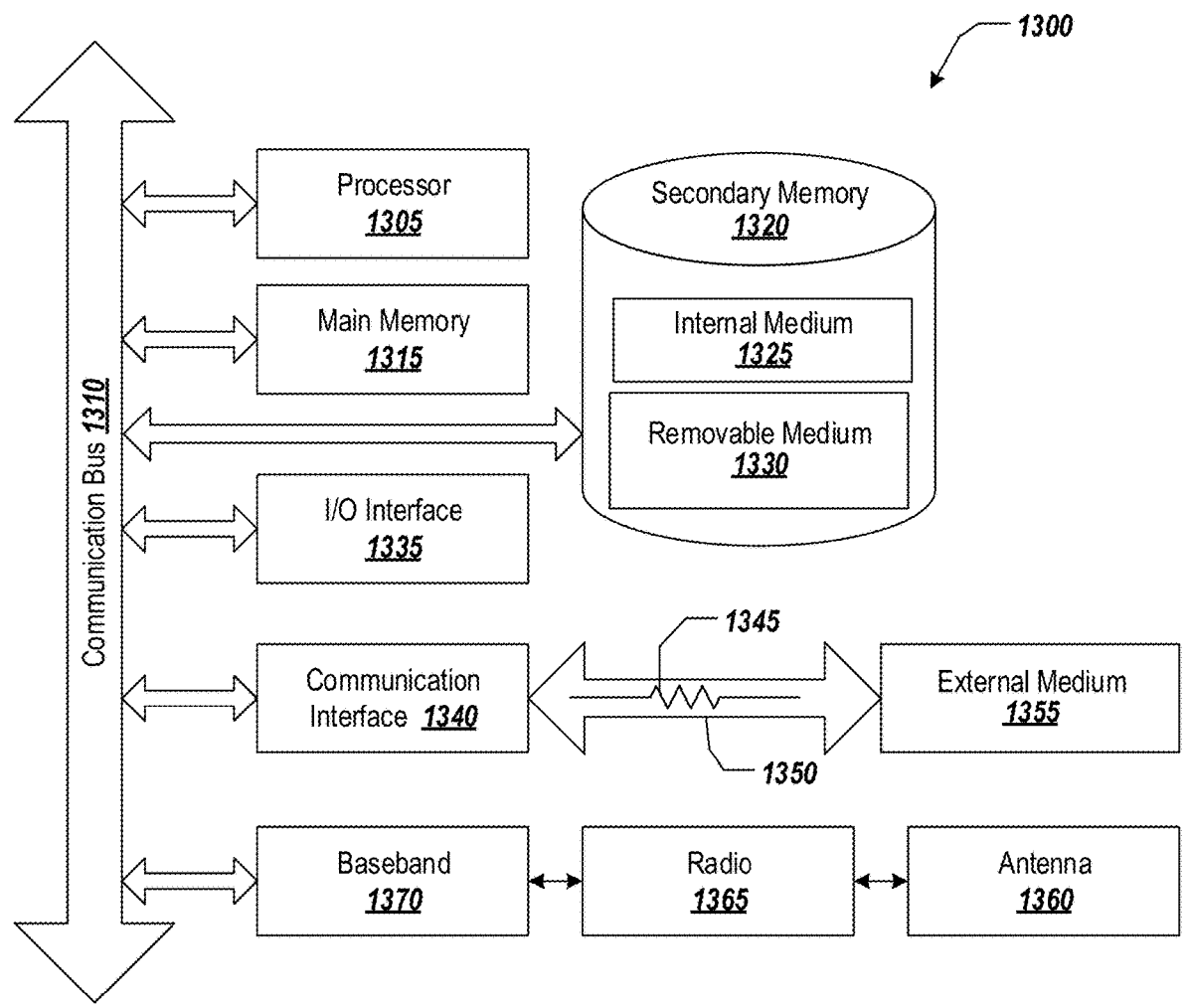
FIG. 13 illustrates an example wired and/or wireless computer device suitable for use in the systems disclosed herein.

FIG. 13 illustrates an example wired and/or wireless computer device suitable for use in the systems disclosed herein. Referring to FIG. 2, the system 1300 may be used to implement the ALPR system 210, ALPR backend system 230, vehicle recognition system 240, the vehicle identification profile system 220, and/or the computing device 216. The system 1300 may be programmed with software comprising instructions that, when executed by at least one processor, cause the system 130 to perform the various functions, processes, and/or methods described herein, for example, as described in connection to FIGS. 2-11.

In various embodiments, the system 1300 can be a conventional personal computer, computer server, personal digital assistant, smart phone, tablet computer, or any other processor-enabled device that is capable of wired or wireless data communication. Other computer systems and/or architectures may be also used, as will be clear to those skilled in the art.

The system 1300 preferably includes one or more processors, such as processor 1305. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 1305.

The processor 1305 is preferably connected to a communication bus 1310. The communication bus 1310 may include a data channel for facilitating information transfer between storage and other peripheral components of the system 1300. The communication bus 1310 further may provide a set of signals used for communication with the processor 1305, including a data bus, address bus, and control bus (not shown). The communication bus 1310 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 1300 preferably includes a main memory 1315 and may also include a secondary memory 1320. The main memory 1315 provides storage of instructions and data for programs executing on the processor 1305. For example, the main memory 1315 may provide storage for the license plate detector circuit 340, the OCR engine, the vehicle recognition engine 450, image frame capture device 420, the compiler engine 460, and the graphical user interface, which may be representative of software modules or engine that, when executed by the processor 1305, perform the functions described in FIGS. 2-11. As another example, the main memory 1315 may be illustrative of one or more of storage device 214 and/or databases 234, 224, and/or 244 and thus provide storage of the data and information stored therein. The main memory 1315 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 1320 may optionally include an internal memory 1325 and/or a removable storage medium 1330, for example a floppy disk drive, a magnetic tape drive, a compact disc ("CD") drive, a digital versatile disc ("DVD") drive, etc. The removable storage medium 1330 is read from and/or written to in a well-known manner. Removable storage medium 1330 may be, for example, a floppy disk, magnetic tape, CD, DVD, SD card, etc.

The removable storage medium 1330 is a non-transitory computer readable medium having stored thereon computer executable code (i.e., software) and/or data. The computer software or data stored on the removable storage medium 1330 is read into the system 1300 for execution by the processor 1305.

In alternative embodiments, the secondary memory 1320 may include other similar means for allowing computer programs or other data or instructions to be loaded into the system 1300. Such means may include, for example, an external storage medium 1355 and a communication interface 1340. Examples of external storage medium 1355 may include an external hard disk drive or an external optical drive, or and external magneto-optical drive.

Other examples of secondary memory 1320 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are the removable storage medium 1330 and a communication interface, which allow software and data to be transferred from an external storage medium 1355 to the system 1300.

System 1300 may also include an input/output ("I/O") interface 1335. The I/O interface 1335 facilitates input from and output to external devices. For example the I/O interface 1335 may receive input from a keyboard, mouse, touch screen, gestures detecting camera, speech command module, etc. and may provide output to a display generated by the graphical user interface. The I/O interface 1335 is capable of facilitating input from and output to various alternative types of human interface and machine interface devices alike.

System 1300 may also include a communication interface 1340. The communication interface 1340 allows software and data to be transferred between system 1300 and external devices (e.g. printers), networks, or information sources. For example, computer software or executable code may be transferred to system 1300 from a network server via communication interface 1340. Examples of communication interface 1340 include a modem, a network interface card ("NIC"), a wireless data card, a communications port, a PCMCIA slot and card, an infrared interface, and an IEEE 1394 fire-wire, just to name a few.

Communication interface 1340 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via the communication interface 1340 are generally in the form of the electrical communication signals 1345. The electrical communication signals 1345 are preferably provided to the communication interface 1340 via a communication channel 1350. In one embodiment, the communication channel 1350 may be a wired or wireless network, or any variety of other communication links. The communication channel 1350 carries the electrical communication signals 1345 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 1315 and/or the secondary memory 1320. Computer programs can also be received via the communication interface 1340 and stored in the main memory 1315 and/or the secondary memory 1320. Such computer programs, when executed, enable the system 1300 to perform the various functions of the present invention as previously described.

In this description, the term "computer readable medium" is used to refer to any non-transitory computer readable storage media used to provide computer executable code (e.g., software and computer programs) to the system 1300. Examples of these media include the main memory 1315, the secondary memory 1320 (including the internal memory 1325, the removable storage medium 1330, and the external storage medium 1355), and any peripheral device communicatively coupled with the communication interface 1340 (including a network information server or other network device). These non-transitory computer readable mediums are means for providing executable code, programming instructions, and software to the system 1300.

In an embodiment that is implemented using software, the software may be stored on a computer readable medium and loaded into the system 1300 by way of removable storage medium 1330, I/O interface 1335, or communication interface 1340. In such an embodiment, the software is loaded into the system 1300 in the form of electrical communication signals 1345. The software, when executed by the processor 1305, preferably causes the processor 1305 to perform the inventive features and functions previously described herein.

The system 1300 also includes optional wireless communication components that facilitate wireless communication over a voice and over a data network. The wireless communication components comprise an antenna system 1360, a radio system 1365 and a baseband system 1370. In the system 1300, radio frequency ("RF") signals are transmitted and received over the air by the antenna system 1360 under the management of the radio system 1365.

In one embodiment, the antenna system 1360 may comprise one or more antennae and one or more multiplexors (not shown) that perform a switching function to provide the antenna system 1360 with transmit and receive signal paths. In the receive path, received RF signals can be coupled from a multiplexor to a low noise amplifier (not shown) that amplifies the received RF signal and sends the amplified signal to the radio system 1365.

In alternative embodiments, the radio system 1365 may comprise one or more radios that are configured to communicate over various frequencies. In one embodiment, the radio system 1365 may combine a demodulator (not shown) and modulator (not shown) in one integrated circuit ("IC"). The demodulator and modulator can also be separate components. In the incoming path, the demodulator strips away the RF carrier signal leaving a baseband received audio signal, which is sent from the radio system 1365 to the baseband system 1370.

If the received signal contains audio information, then baseband system 1370 decodes the signal and converts it to an analog signal. Then the signal is amplified and sent to a speaker. The baseband system 1370 also receives analog audio signals from a microphone. These analog audio signals are converted to digital signals and encoded by the baseband system 1370. The baseband system 1370 also codes the digital signals for transmission and generates a baseband transmit audio signal that is routed to the modulator portion of the radio system 1365. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 1360 where the signal is switched to the antenna port for transmission.

The baseband system 1370 is also communicatively coupled with the processor 1305. The processor 1305 has access to one or more data storage areas including, for example, but not limited to, the main memory 1315 and the secondary memory 1320. The processor 1305 is preferably configured to execute instructions (i.e., computer programs or software) that can be stored in the main memory 1315 or in the secondary memory 1320. Computer programs can also be received from the baseband processor 1370 and stored in the main memory 1315 or in the secondary memory 1320, or executed upon receipt. Such computer programs, when executed, enable the system 1300 to perform the various functions of the present invention as previously described. For example, the main memory 1315 may include various software modules (not shown) that are executable by processor 1305.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described can be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

While various embodiments have been described above, it should be understood that they have been presented by way of example only, and not of limitation. The breadth and scope should not be limited by any of the above-described example embodiments. Where this document refers to technologies that would be apparent or known to one of ordinary skill in the art, such technologies encompass those apparent or known to the skilled artisan now or at any time in the future. In addition, the described embodiments are not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the described embodiments.

Furthermore, although items, elements or components can be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases can be absent.

While various embodiments have been described above, it is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Although the present disclosure provides certain example embodiments and applications, other embodiments that are apparent to those of ordinary skill in the art, including embodiments which do not provide all of the features and advantages set forth herein, are also within the scope of this disclosure.

What is claimed is:

1. A vehicle identification method, the method comprising:
    capturing, by a camera, a read of a vehicle comprising at least one image frame from a video signal including at least a portion vehicle;
    identifying at least one of a license plate number and a descriptor of the vehicle contained in the read using image processing on the at least one image frame;
    determining a probability value that the read includes the vehicle based on the identified at least one of the license plate number and the descriptor;
    when the probability value exceeds a threshold value, identifying a vehicle identification profile in a database using the identified at least one of the license plate number and the descriptor, the identified vehicle identification profile comprising one or more other vehicle reads associated with the identified at least one of the license plate number and the descriptor based on probability values that the other vehicle reads correspond to the vehicle; and
    updating the vehicle identification profile to include the captured read,
    wherein the vehicle identification profile is associated with a probability value based on probability values of each of the other vehicle reads of the vehicle identification profile, and updating the vehicle identification profile comprises updating the probability value of the vehicle identification profile based on the probability values associated with the captured read.

2. The method of claim 1, wherein capturing the read comprises detecting the license plate in the video signal and, in response said detection, capturing the at least one image frame.

3. The method of claim 1, wherein identifying the license plate number comprises performing optical character recognition on the at least one image frame to recognize one or more alphanumeric characters from the license plate.

4. The method of claim 1, wherein identifying the descriptor of the vehicle comprises performing object recognition on the at least one image frame to identify the characteristics of the vehicle.

5. The method of claim 1, wherein identifying the vehicle identification profile comprises identifying other vehicle reads stored in the vehicle identification profile that match the vehicle read based on the probability values.

6. The method of claim 5, wherein identifying the other vehicle reads comprises identifying other vehicle reads associated with a license plate number that matches the license plate number identified from the captured read based on a probability value of the license plate number.

7. The method of claim 5, wherein identifying the other vehicle reads comprises identifying other vehicle reads associated with descriptors that match the descriptor identified from the captured read based on probability values of the identified descriptor.

8. The method of claim 1, wherein
    the license plate number is identified based on an automatic license plate recognition (ALPR) system, and
    the one or more visual characteristics are identified based on a vehicle recognition system.

9. The method of claim 1, wherein the camera is a part of an in-car video (ICV) system comprising a plurality of cameras disposed on and within another vehicle.

10. A vehicle identification system, the system comprising:
    a camera configured to capture a read of a vehicle comprising at least one image frame from a video signal including a vehicle;
    at least one database configured to store vehicle identification profiles; and
    at least one processor configured to execute instructions stored on a memory to:
        identify at least one of a license plate number and a descriptor of the vehicle contained in the read using image processing on the at least one image frame;
        determine a probability value that the read includes the vehicle based on the identified at least one of the license plate number and the descriptor;
        when the probability value exceeds a threshold value, identify a vehicle identification profile in a database using the identified at least one of the license plate number and the descriptor, the identified vehicle identification profile comprising one or more other vehicle reads associated with the identified at least one of the license plate number and the descriptor based on probability values that the other vehicle reads correspond to the vehicle; and
        update a vehicle identification profile to include the captured read,
        wherein the vehicle identification profile is associated with a probability value based on probability values of each of the other vehicle reads of the vehicle identification profile, and updating the vehicle identification profile comprises updating the probability value of the vehicle identification profile based on the probability values associated with the captured read.

11. The system of claim 10, wherein capturing the read comprises detecting the license plate in the video signal and, in response said detection, capturing the at least one image frame.

12. The system of claim 10, wherein identifying the license plate number comprises performing optical character recognition on the at least one image frame to recognize one or more alphanumeric characters from the license plate.

13. The system of claim 10, wherein identifying the descriptor of the vehicle comprises performing object recognition on the at least one image frame to identify the characteristics of the vehicle.

14. The system of claim 10, wherein identifying the vehicle identification profile comprises identifying other vehicle reads stored in the vehicle identification profile that match the vehicle read based on the probability values.

15. The system of claim 14, wherein identifying the other vehicle reads comprises identifying other vehicle reads associated with a license plate number that matches the license plate number identified from the captured read based on a probability value of the license plate number.

16. The system of claim 14, wherein identifying the other vehicle reads comprises identifying other vehicle reads associated with descriptors that match the descriptor identified from the captured read based on probability values of the identified descriptor.

17. The system of claim 10, further comprising:
  an automatic license plate recognition (ALPR) system configured to identify the license plate number; and
  a vehicle recognition system configured to identify the one or more visual characteristics.

18. The system of claim 10, wherein the camera is a part of an in-car video (ICV) system comprising a plurality of cameras disposed on and within another vehicle.

\* \* \* \* \*